US009528040B2

(12) United States Patent
Gaertner et al.

(10) Patent No.: US 9,528,040 B2
(45) Date of Patent: Dec. 27, 2016

(54) ADDITIVES FOR BOOSTING PERFORMANCE OF WATER-BASED DRILLING FLUIDS, DRILLING FLUIDS INCLUDING SAME, AND METHODS OF MAKING AND USING SAME

(71) Applicant: ViChem Specialty Products, LLC, Conroe, TX (US)

(72) Inventors: James P. Gaertner, Buda, TX (US); Corey G. Peterson, Conroe, TX (US)

(73) Assignee: ViChem Speciality Products LLC, Conroe, TX (US)

( * ) Notice: Subject to any disclaimer, the term of this patent is extended or adjusted under 35 U.S.C. 154(b) by 0 days.

(21) Appl. No.: 14/323,015

(22) Filed: Jul. 3, 2014

(65) Prior Publication Data
US 2016/0002522 A1    Jan. 7, 2016

(51) Int. Cl.
*C09K 8/28* (2006.01)
*C09K 8/04* (2006.01)

(52) U.S. Cl.
CPC ............. *C09K 8/04* (2013.01); *C09K 2208/12* (2013.01); *C09K 2208/32* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 4,063,603 A | 12/1977 | Rayborn | |
| 4,216,836 A | 8/1980 | Rayborn | |
| 4,356,096 A | 10/1982 | Cowan et al. | |
| 4,404,107 A | 9/1983 | Cowan et al. | |
| 4,428,843 A | 1/1984 | Cowan et al. | |
| 4,645,608 A | 2/1987 | Rayborn | |
| 4,988,450 A | 1/1991 | Wingrave et al. | |
| 5,114,597 A | 5/1992 | Rayborn et al. | |
| 5,114,598 A | 5/1992 | Rayborn et al. | |
| 5,272,236 A | 12/1993 | Lai et al. | |
| 5,843,872 A | 12/1998 | Rayborn et al. | |
| 5,891,832 A | 4/1999 | Rayborn et al. | |
| 5,942,467 A | 8/1999 | Rayborn et al. | |
| 6,291,405 B1 * | 9/2001 | Lee | C09K 8/06 507/136 |
| 6,462,096 B1 | 10/2002 | Dino et al. | |
| 6,703,351 B2 | 3/2004 | Stowe, II et al. | |
| 6,734,145 B2 | 5/2004 | Rayborn | |
| 6,737,384 B2 | 5/2004 | Rayborn | |
| 6,774,089 B2 | 8/2004 | Rayborn | |
| 6,821,931 B2 | 11/2004 | Rayborn | |
| 6,892,887 B2 | 5/2005 | Rayborn | |
| 7,001,871 B2 | 2/2006 | Rayborn | |
| 7,008,907 B2 | 3/2006 | Kirsner et al. | |
| 7,056,867 B2 | 6/2006 | Rayborn | |
| 7,060,660 B2 | 6/2006 | Rayborn | |
| 7,067,461 B2 | 6/2006 | Rayborn | |
| 7,268,100 B2 | 9/2007 | Kippie et al. | |
| 7,745,378 B1 | 6/2010 | Rayborn, Sr. | |
| 7,763,570 B1 | 7/2010 | Rayborn et al. | |
| 7,786,049 B2 | 8/2010 | Temple et al. | |
| 7,964,537 B2 | 6/2011 | Rayborn et al. | |
| 7,972,995 B2 | 7/2011 | Rayborn et al. | |
| 8,101,555 B2 | 1/2012 | Rayborn et al. | |
| 8,193,125 B2 | 6/2012 | Muller et al. | |
| 8,216,981 B2 | 7/2012 | Rayborn et al. | |
| 8,236,735 B2 | 8/2012 | Maker et al. | |
| 8,389,447 B2 | 3/2013 | Dino et al. | |
| 8,673,825 B2 | 3/2014 | Rayborn et al. | |
| 2004/0204323 A1 | 10/2004 | Temple et al. | |
| 2005/0197255 A1 * | 9/2005 | Otto | C09K 8/035 507/100 |
| 2007/0078068 A1 * | 4/2007 | Askew | C09K 8/34 508/428 |

FOREIGN PATENT DOCUMENTS

EP    0608369    5/1997

OTHER PUBLICATIONS

Picket, Al; "Newpark's Evolutions® system, a 'win/win solution'"; Oct. 1, 2011; News; http://www.newpark.com/news/2011/newpark's-evolution-system,-a-"winwin-solution"; Newpark Resources, Inc.; The Woodlands, TX; US.
Bryer, Brett; "Evolution® tames pesky Mississippian in Northern Oklahoma's Kingfisher County"; Mar. 1, 2012; News; http://www.newpark.com/news/2012/evolution-tames-pesky-mississippian-in-northern-oklahoma's-kingfisher-county; Newpark Resources, Inc.; The Woodlands, TX; US.
Young et al; Novel Inhibitor Chemistry Stabilizes Shales; Apr. 11-12, 2006; AADE-06-DF-HO-39; 2006 AADS Drilling Fluids Technical Conference; American Association of Drilling Engineers; Houston, TX; US.
Langford et al; "Application of High Performance Water-Based Mud in Woodbine Horizontal Wells" Feb. 26-27, 2013; AADE-13-FTCE-07; 2013 AADS Drilling Fluids Technical Conference; American Association of Drilling Engineers; Houston, TX; US.
Gaertner et al; Utilizing the Unique Properties of Multi-Hydroxyl Alcohols to Drill Reactive Shales while Maintaining Environmental Compliance; Feb. 26-27, 2013; AADE-13-FTCE-19; AADS Drilling Fluids Technical Conference; American Association of Drilling Engineers; Houston, TX; US.
Maliardi et al.; "Innovative technology improves lubricity in high performance water base mud systems: field application in a challenging HP/HT environment"; Nov. 10-13, 2013; ADIPEC 2013 Technical conference; www.adipec.com; ADIPEC; Abu Dhabi, UAE.

(Continued)

*Primary Examiner* — Jeffrey Washville
(74) *Attorney, Agent, or Firm* — Jeffrey L. Wendt; The Wendt Firm, P.C.

(57) ABSTRACT

An additive composition for boosting performance of water-based drilling fluids. Modified water-based drilling fluids including the additive composition. Methods of making the additive compositions. Methods of using the modified drilling fluids to drill or perform other operations in reactive shale formations. The additive compositions include one or more multi-hydroxyl alcohols, a lubricant mix, a shale inhibitor, a strong base to adjust pH, and optionally water up to about 20 percent by volume, based on total volume of the additive composition.

31 Claims, No Drawings

(56) References Cited

OTHER PUBLICATIONS

Amoco; "Wellbore Stability—Drilling Handbook"; Aug. 25, 2011; Esteban Gozalo; http://www.scribd.com/doc/63087286/Amoco-Wellbore-Stability; Scribd, San Francisco, CA; US.

Newpark Resources, Inc.; "Deepdrill"; Nov. 6, 2014; http://www,newpark.com/capabilities/newpark-drilling-fluids/united-states/drilling-fluid-systems/deepdrill; Newpark Resources, Inc.; The Woodlands, TX; US.

Newpark Resources, Inc.; "Product Bulletin—DeepDrill® Inhibitor Shale Inhibitor"; at least as early as Nov. 2014; Newpark Resources, Inc.; The Woodlands, TX; US.

Newpark Resources, Inc.; "DeepDrill® The Next Generation"; Apr. 2013; Newpark Drilling Fluids; The Woodlands, TX; US.

Newpark Resources, Inc.; "Evolube™ Drilling Performance Enhancer"; Mar. 2011; Newpark Drilling Fluids; The Woodlands, TX; US.

Newpark Resources, Inc.; "Evolution® Water-Based Drilling Fluids System"; at least as i early as Nov. 2014; Newpark Drilling Fluids; The Woodlands, TX; US.

Newpark Resources, Inc.; "FlexDrill™ Evolutionary Validation"; Apr. 2013; Newpark Drilling Fluids; The Woodlands, TX; US.

M-I Swaco; "Industry's most flexible high performing water-based drilling fluid"; no month, 2014; http://www.sib.com/services/miswaco/services/drilling_fluid/df_systems/water_base_fluid_systems/glydril.aspx; M-I SWACO, LLC; A Schlumberger Company; Sugarland, TX; US.

Newpark Resources, Inc.; "Product Bulletin HiPerm™ Clay Inhibitor"; at least as early as Nov. 2014; Newpark Drilling Fluids; The Woodlands, TX; US.

The Mud Masters Group; Master Clear Fluid™ Polymerized Carbohydrate Solution; no month 2011; The Mud Masters Group; Houston, TX; US.

Redburn et al; "Field Lubricity Measurements Correlate with improved Performance of Novel Water-Based Drilling Fluid"; Mar. 20-22, 2013; The 11th Offshore Mediterranean Conference and Exhibition; Ravenna; IT.

Baker Hughes; "Performax High-Performance Water-Based Fluid System"; Fluids and Chemicals; no month 2010; Baker Hughes Incorporated; Houston, TX; US.

* cited by examiner

ADDITIVES FOR BOOSTING PERFORMANCE OF WATER-BASED DRILLING FLUIDS, DRILLING FLUIDS INCLUDING SAME, AND METHODS OF MAKING AND USING SAME

BACKGROUND INFORMATION

Technical Field

The present disclosure relates to compositions and methods in the onshore and marine (offshore) hydrocarbon exploration, production, drilling, well completion, well intervention, and leak containment fields.

Background Art

While the present discussion centers on additives for drilling fluids, it will be recognized that the fluids discussed herein are not so limited in their use. Drilling fluids have been used for decades in the hydrocarbon recovery field and other fields. The two basic types known in the art are water-in-oil (W/O) emulsions or dispersions, which are also referred to herein as oil-based drilling fluids, oil-based muds, or oil-based mud systems; and oil-in-water (O/W) emulsions or dispersions, which are also referred to herein as water-based drilling fluids, water-based muds, or water-based mud systems. In W/O drilling fluids, a minor amount (<50%) of an aqueous phase is dispersed in a major amount (>50%) of an hydrocarbon phase. In O/W drilling fluids, a minor amount (<50%) of an oil or hydrocarbon phase is dispersed in an aqueous phase. The present disclosure is concerned with additives for O/W drilling fluids, the resulting drilling fluids, and methods of using same in drilling and other operations.

When drilling in or through shale rock to reach or explore for a hydrocarbon-bearing subterranean formation, the industry has encountered challenges, which have become more acute in light of recent developments in so-called unconventional shale oil and gas recovery. Problems for the drilling fluid additive formulator, when the fluid is to be used for drilling in or through shale to reach a hydrocarbon-bearing subterranean formation include: finding the right components to provide desired effects (lubricity, shale inhibition, ROP (rate of penetration), and wellbore stability; ensuring HSE compliance (toxicity, safety (corrosivity, flash point, non-oxidizing), and environmentally acceptable); combining the components in such a manner that they have long-term stability, the right viscosity, and reasonable pour point; ensuring the fluid does not negatively impact properties of both clay and polymer-based drilling fluids, especially viscosity and API Filtrate; and finding components heat stable to 300° F. (149° C.). The drilling fluid additives of the present disclosure seek to enhance the performance of water-based drilling fluids in terms of one or more of lubricity, shale inhibition, ROP, and/or wellbore stability.

Certain drilling fluid additives are known in the art. U.S. Pat. No. 4,988,450 discloses additive compositions and aqueous drilling fluids which impart improved wellbore stability in drilling shale formations consisting essentially of one or more water-soluble high molecular weight polymers capable of forming relatively strong nucleophilic sites when treated with base and one or more potassium salts which have sufficient alkalinity to raise the pH of the resultant drilling fluid to above 9.0, but whose anions are relatively weak nucleophiles compared to the polymeric nucleophilic sites. While wellbore stability may be improved, there is no discussion of lubricity, or additive ingredients that may improve this property. Several drilling fluid additive patents disclose the use of lecithin. U.S. Pat. Nos. 6,462,096 and 8,389,447 disclose oil-based drilling fluids containing certain organoclays as rheological additives for use in high temperature drilling applications, and lecithin as one of the preferred surfactants or emulsifiers. U.S. Pat. No. 7,008,907 discloses oil-based drilling fluids containing as a first part a carboxylic acid-terminated polyamide and/or a wetting agent, and as a second part a mixture produced by the Diels-Alder reaction of dienophiles, preferably carboxylic acids, polycarboxylic acids, acid anhydrides, or combinations or mixes thereof, with a mixture of fatty acids and resin acids. These two components or parts are blended or mixed and further reacted with cations to form soaps. Lecithin is one preferred wetting agent. Both patents relate to oil-based drilling fluids. U.S. Pat. No. 8,193,125 discloses oil-in-water and water-in-oil drilling fluids, and in the case of water-in-oil emulsions, suitable emulsifier components are alkyl (poly)glycosides of long-chain alcohols and also the fatty alcohols of natural and/or synthetic origin or alkylolamides, amine oxides and lecithins. The '125 patent mentions that use of alkyl(poly)glycoside compounds (APG compounds) as emulsifiers may be of particular interest because of their ecological compatibility. U.S. Pat. No. 8,236,735 discloses oligoglycerol fatty acid ester lubricant additives for drilling fluids, wherein the drilling fluid to which the additive may be added may include fatty alcohols of natural and/or synthetic origin or alkylolamides, amine oxides and lecithins. U.S. Pat. No. 7,268,100 discloses an a water-based drilling fluid comprising a choline salt or a plurality of choline salts given by the general formula: $HOCH_2CH_2N^+(CH_3)_3.R^1COO^-$, wherein $R^1$ is an alkyl group, alkenyl group, alkynyl group, an aryl group, an alkaryl group, an aralkyl group, alkenylaryl group, aralkenyl group, alkynylaryl group, aralkynyl group hetero atom analogs, where the hetero atom is selected from the group consisting of boron, nitrogen, oxygen, fluorine, phosphorus, sulfur, chlorine, bromine, iodine, and mixture or combinations thereof, or mixtures or combinations thereof, a foamer, and water. U.S. Pat. No. 7,786,049 discloses drilling fluids with improved shale inhibition and methods of drilling in subterranean formations. In our recent paper, "Utilizing the Unique Properties of Multi-Hydroxyl Alcohols to Drill Reactive Shales while Maintaining Environmental Compliance", AADE-13-FTCE-19, presented at the February, 2013 American Association of Drilling Engineers (AADE) National Technical Conference and Exhibition, we disclosed a water-based drilling fluid additive based on multi-hydroxyl alcohols. An optimized system was disclosed as a formulation consisting of a balance of polymers, water loss reagents, vegetable oil lubricant known under the trade designation L-20 (ViChem Specialty Products LLC, Conroe, Tex., USA), multi-hydroxyl alcohol (MHA) Base Fluid, and shale inhibitor known under the trade designation SI-60 (ViChem) optimized by testing to deliver optimal shale inhibition for each of several shale samples. Each of the aqueous drilling fluids was pH adjusted to 9.0.

Despite these improvements, there remains a need for additive formulations for water-based drilling fluids comprising the right components to provide desired lubricity, shale inhibition, ROP, and wellbore stability, while ensuring HSE compliance, long-term stability, viscosity, and reasonable pour point. There also remain a need for additive formulations that do not negatively impact properties of both clay and polymer-based drilling fluids, especially viscosity and API Filtrate, and finding components heat stable to 300°

F. (149° C.). The compositions and methods of the present disclosure are directed to these needs.

SUMMARY

In accordance with the present disclosure, additive formulations for water-based drilling fluids, drilling fluids comprising same, and methods of making and using same are described which reduce or overcome many of the faults of previously known additives, water-based drilling fluids and methods. In particular, the additive formulations of the present disclosure are the result of intense investigation into how to appropriately combine the various ingredients (in particular a multihydroxyl alcohol (MHA) base fluid base fluid, a lubricant mixture, a shale inhibitor, and pH adjustment) into a single additive composition that exhibits long-term stability in terms of viscosity and reasonable pour point, and when combined with a WBM system, the additive-modified WBM system exhibits desired lubricity, shale inhibition, ROP, and wellbore stability, while ensuring HSE compliance, and that do not negatively impact properties of both clay and polymer-based drilling fluids, especially their viscosity, API Filtrate, and heat stability (up to 300° F. (149° C.)). This gives the advantage of using the same or very similar additive formulations with virtually any WBM system.

One aspect of the present disclosure comprises additive compositions for boosting performance of water-based drilling fluids, the additive composition comprising:
(a) from about 60 to about 97.5 volume percent of one or more multi-hydroxyl alcohols containing chloride levels less than 5000 parts per million (more preferably less than 4000 ppm, even more preferably less than 3000 ppm), based on total volume of the additive composition;
(b) from about 2.5 to about 40 volume percent of a lubricant consisting of a mixture of vegetable oil phospholipids, one or more free fatty acids, and soy oil, based on total volume of the additive composition;
(c) from about 0.25 to about 8.0 volume percent of one or more free fatty acids, based on total volume of the additive composition;
(d) from about 0.75 to about 20 volume percent of one or more lecithins, based on total volume of the additive composition;
(e) from about 0.75 to about 16 volume percent of soy oil, based on total volume of the additive composition;
(f) from about 0.01 to about 1.0 pounds per gallon of one or more shale inhibitors (preferably a potassium salt selected from the group consisting of including KOH, $CH_3CO_2K$, KCl, $K_2CO_3$, or $CHKO_2$)), based on one gallon of the additive composition;
(g) from about 0.1 to about 10 pounds per barrel of one or more strong bases (preferably selected from the group consisting of NaOH, KOH, or $Ca(OH)_2$), based on one barrel of the additive composition;
(h) optionally in the presence of water, up to about 20 percent by volume, based on total volume of the additive composition,
with the proviso that if (b) is present, then (c), (d), and (e) are absent, and vice versa.

Another aspect of the present disclosure is additive compositions for boosting performance of water-based drilling fluids, the additive composition consisting essentially of: (a) from about 60 to about 97.5 volume percent of one or more multi-hydroxyl alcohols containing chloride levels less than 5000 parts per million, based on total volume of the additive composition; (b) from about 2.5 to about 40 volume percent of a lubricant consisting of a mixture of vegetable oil phospholipids, one or more free fatty acids, and soy oil, based on total volume of the additive composition; (c) from about 0.25 to about 8.0 volume percent of one or more free fatty acids, based on total volume of the additive composition; (d) from about 0.75 to about 20 volume percent of one or more lecithins; (e) from about 0.75 to about 16 volume percent of soy oil; (f) from about 0.01 to about 1.0 pounds per gallon of one; or more shale inhibitors (preferably a potassium salt selected from the group consisting of including KOH, $CH_3CO_2K$, KCl, $K_2CO_3$, or $CHKO_2$)), based on one gallon of the additive composition; (g) from about 0.1 to about 10 pounds per barrel of one or more strong bases (preferably selected from the group consisting of NaOH, KOH, or $Ca(OH)_2$), based on one barrel of the additive composition; (h) optionally in the presence of water, up to about 20 percent by volume, based on total volume of the additive composition; with the proviso that if (b) is present, then (c), (d), and (e) are absent, and vice versa.

Still another aspect of the present disclosure is additive compositions for boosting performance of water-based drilling fluids, the additive composition consisting of: (a) from about 60 to about 97.5 volume percent of one or more multi-hydroxyl alcohols containing chloride levels less than 5000 parts per million, based on total volume of the additive composition; (b) from about 2.5 to about 40 volume percent of a lubricant consisting of a mixture of vegetable oil phospholipids, one or more free fatty acids, and soy oil, based on total volume of the additive composition; (c) from about 0.25 to about 8.0 volume percent of one or more free fatty acids, based on total volume of the additive composition; (d) from about 0.75 to about 20 volume percent of one or more lecithins; (e) from about 0.75 to about 16 volume percent of soy oil; (f) from about 0.01 to about 1.0 pounds per gallon of one or more shale inhibitors (preferably a potassium salt selected from the group consisting of including KOH, $CH_3CO_2K$, KCl, $K_2CO_3$, or $CHKO_2$)), based on one gallon of the additive composition; (g) from about 0.1 to about 10 pounds per barrel of one or more strong bases (preferably selected from the group consisting of NaOH, KOH, or $Ca(OH)_2$), based on one barrel of the additive composition; (h) optionally in the presence of water, up to about 20 percent by volume, based on total volume of the additive composition; with the proviso that if (b) is present, then (c), (d), and (e) are absent, and vice versa.

Still another aspect of the present disclosure is additive compositions, and water-based drilling fluids including same, for boosting performance of water-based drilling fluids, the additive composition comprising (a) from about 70 to about 95 volume percent of one or more multi-hydroxyl alcohols containing chloride levels less than 5000 parts per million, based on total volume of the additive composition; (b) from about 5 to about 30 volume percent of a lubricant consisting of a mixture of vegetable oil phospholipids, one or more free fatty acids, and soy oil, based on total volume of the additive composition; (c) from about 0.5 to about 6.0 volume percent of one or more free fatty acids, based on total volume of the additive composition; (d) from about 0.5 to about 15 volume percent of one or more lecithins; (e) from about 1.5 to about 12 volume percent of soy oil; (f) from about 0.04 to about 0.4 pounds per gallon of one or more shale inhibitors, based on one gallon of the additive composition; (g) from about 0.5 to about 5 pounds per barrel of one or more strong bases, based on one barrel of the additive composition; and (h) optionally in the presence of water, up to about 10 percent by volume, based on total volume of the additive composition; with the proviso that if (b) is present, then (c), (d), and (e) are absent, and vice versa.

Still another aspect of the present disclosure is additive compositions, and water-based drilling fluids including same, for boosting performance of water-based drilling fluids, the additive composition comprising (a) from about 80 to about 90 volume percent of one or more multi-hydroxyl alcohols containing chloride levels less than 5000 parts per million, based on total volume of the additive composition; (b) from about 10 to about 20 volume percent of a lubricant consisting of a mixture of vegetable oil phospholipids, one or more free fatty acids, and soy oil, based on total volume of the additive composition; (c) from about 1 to about 4 volume percent of one or more free fatty acids, based on total volume of the additive composition; (d) from about 3.0 to about 10 volume percent of one or more lecithins; (e) from about 3.0 to about 8.0 volume percent of soy oil; (f) from about 0.04 to about 0.1 pounds per gallon of one or more shale inhibitors, based on one gallon of the additive composition; (g) from about 1.5 to about 3.0 pounds per barrel of one or more strong bases, based on one barrel of the additive composition; and (h) from about 2 to about 7 volume percent water, based on total volume of the additive composition; with the proviso that if (b) is present, then (c), (d), and (e) are absent, and vice versa.

Another aspect of the present disclosure is a drilling fluid comprising one or more drilling fluid additive compositions of this disclosure admixed with one or more water-based drilling fluids. Another aspect of the present disclosure is a drilling fluid consisting essentially of one or more drilling fluid additive compositions of this disclosure admixed with one or more water-based drilling fluids. Still another aspect of the present disclosure is a drilling fluid consisting of one or more drilling fluid additive compositions of this disclosure admixed with one or more water-based drilling fluids. Another aspect of the present disclosure is a drilling fluid comprising a drilling fluid additive composition of this disclosure admixed with a water-based drilling fluid. Another aspect of the present disclosure is a drilling fluid consisting essentially of a drilling fluid additive composition of this disclosure admixed with a water-based drilling fluid. Still another aspect of the present disclosure is a drilling fluid consisting of a drilling fluid additive composition of this disclosure admixed with a water-based drilling fluid.

Another aspect of the disclosure is a method of making a drilling fluid additive of the present disclosure suitable for boosting performance of water-based drilling fluids. In certain embodiments the method comprises placing or routing MHA to a mixing device; adding to the MHA approximately 1.0 pound per barrel pre-hydrated or solubilized shale inhibitor with agitation, optionally adding additional pre-hydrated shale inhibitor if requested; slowly adding approximately 90% of the total lubricant mix to be added, with continued agitation, the lubricant mix consisting of a mixture of vegetable oil phospholipids, one or more free fatty acids, and soy oil; checking the pH; and adjusting the pH to 8.5+/−1.0 by adding either strong base or additional lubricant mix (the lubricant mix tends to be acidic). In certain embodiments the method comprises placing or routing MHA to a mixing device; adding to the MHA approximately 1.0 pound per barrel pre-hydrated or solubilized shale inhibitor with agitation, optionally adding additional pre-hydrated shale inhibitor if requested; adding approximately 90% of the total lubricant mix to be added, with continued agitation, the lubricant mix consisting of from about 0.25 to about 8.0 volume percent of one or more free fatty acids, based on total volume of the additive composition, from about 0.75 to about 20 volume percent of one or more lecithins, based on total volume of the additive composition, and from about 0.75 to about 16 volume percent of soy oil, based on total volume of the additive composition; checking the pH; and adjusting the pH to 8.5+/−1.0 by adding either more strong base or additional lubricant mix.

In other aspects, the present disclosure relates to methods of making and using water-based drilling fluids, the water-based drilling fluids either comprising, consisting essentially of, or consisting of one or more additive compositions of the present disclosure.

These and other features of the compositions and methods of the disclosure will become more apparent upon review of the detailed description and claims that follow.

DETAILED DESCRIPTION

In the following description, numerous details are set forth to provide an understanding of the disclosed compositions and methods. However, it will be understood by those skilled in the art that compositions and methods disclosed herein may be practiced without these details and that numerous variations or modifications from the described embodiments may be possible. For purposes of United States patent practice, the contents of any patent, patent application, or publication referenced herein are hereby incorporated by reference in their entirety (or the equivalent US version thereof is so incorporated by reference), irrespective of the page, paragraph, or section in which they are referenced, and especially with respect to the disclosure of synthetic techniques, definitions (to the extent not inconsistent with any definitions provided herein) and general knowledge in the art.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on volume and all test methods are current as of the filing date hereof. The acronym "ASTM" means ASTM International, 100 Barr Harbor Drive, PO Box C700, West Conshohocken, Pa., 19428-2959 USA. The acronym "API" means American Petroleum Institute, Washington, D.C., USA.

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: R=RL+k*(RU−RL), wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether monomeric, oligomeric, polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge. The term "amorphous" refers to a polymer lacking a crystalline melting point as determined by differential scanning calorimetry (DSC) or equivalent technique.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms, but no hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno-group is within the scope of the term heteroalkyl. Examples of specific heteroalkyl groups include cyanomethyl-, benzoylmethyl-, (2-pyridyl)methyl-, and trifluoromethyl-groups.

As used herein the term "aromatic" refers to a polyatomic, cyclic, conjugated ring system containing $(4\delta+2)$ π-electrons, wherein $\delta$ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others. "Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone, or oxygen as in diphenylether, or nitrogen as in diphenylamine.

The compositions of the instant disclosure are additives for water-based drilling fluids, and water-based drilling fluids including one or more additive compositions of this disclosure. Methods of producing and using the same are considered within the present disclosure.

In one embodiment, the additive composition of the instant disclosure comprises the admixing product of (a) from about 60 to about 97.5 volume percent of one or more multi-hydroxyl alcohols (MHA), based on total volume of the additive composition; (b) from about 2.5 to about 40 volume percent of a lubricant comprising a mixture of vegetable oil phospholipids, one or more free fatty acids, and soy oil, based on total volume of the additive composition; (c) from about 0.25 to about 8.0 volume percent of one or more free fatty acids, based on total volume of the additive composition; (d) from about 0.75 to about 20 volume percent of one or more lecithins; (e) from about 0.75 to about 16 volume percent of soy oil; (f) from about 0.01 to about 1.0 pounds per gallon of one or more shale inhibitors (preferably a potassium salt selected from the group consisting of including KOH, $CH_3CO_2K$, KCl, $K_2CO_3$, or $CHKO_2$)), based on one gallon of the additive composition; (g) from about 0.1 to about 10 pounds per barrel of one or more strong bases (preferably selected from the group consisting of NaOH, KOH, or $Ca(OH)_2$), based on one barrel of the additive composition; (h) optionally in the presence of water, up to about 20 percent by volume.

Water-based drilling fluids of the present disclosure may comprise at least 0.5 percent by volume of one or more additive compositions, based on the total volume of the water-based drilling fluid (where "total volume" means volume of original water-based drilling fluid or fluids plus one or more additive composition of this disclosure). In certain embodiments, the additive composition may be present at a concentration ranging from about 0.5 to about 30 percent by volume, based on total volume of the mixture of original fluid and additive composition. All individual values and subranges from about 0.5 up to about 30 volume percent are included herein and disclosed herein; for example, the volume percent of the additive composition may range from a lower limit of 0.5, 2, 7, 8, 8.5, 9, 10, 11, 15, 20, 25 or 29 volume percent to an upper limit of 5, 7, 8, 8.5, 9, 9.5, 10, 11, 15, 20, 25, or 30 volume percent. For example, the additive composition may comprise from 5 to 30 percent, or from 10 to 30 percent, or from 7.5 to 9.5 percent, or from 8 to 15 percent, or from 10 to 20 percent, or from 9 to 17 percent by volume, based on the total volume of the additive composition.

In certain embodiments, the additive compositions of the present disclosure may be used in water-based drilling fluids, water-based coiled tubing fluids, water-based fracing fluids, water-based stimulation fluids, and water-based packer fluids in various industries such as oilfield, water well drilling, any type of boring (directional or otherwise) operation. Additive compositions of the present disclosure may be added directly to the fluid otherwise being used, or the additive compositions may be employed neat and used in sweeps.

The water-based drilling fluids of the present disclosure may further comprise one or more fillers, one or more binders, one or more pigments, one or more film forming aids, one or more crosslinking agents, one or more conductivity enhancer agents, one or more rheology modifying agents, and the like.

The water-based drilling fluids of the present disclosure may be used alone as a separate drilling fluid, or may be incorporated into one or other fluids as a drilling fluid system or other fluid system (for example a fracing, stimulation, or completion fluid system).

In certain embodiments the additive composition may comprise from at least 60 percent by volume, up to about 97.5 percent by volume, of one or more multi-hydroxyl alcohols, including monomeric or polymeric polyols, including but not limited to glycols, substituted glycols, glycol ethers, glycol esters, glycerols, substituted glycerols, glycerol ethers, glycerol esters, polyglycerols, substituted polyglycerols, and alkyl glucosides wherein the alkyl has from 1 to 30 carbon atoms, and mixtures and combinations of two or more thereof, based on the total volume of the additive composition. All individual values and subranges from at least 60 up to about 97.5 volume percent are included herein and disclosed herein; for example, the volume percent of the one or more multi-hydroxyl alcohols can be from a lower limit of 60, 70, 75, 80, 85, 90, or 95 volume percent to an upper limit of 70, 75, 80, 85, 90, 95 or 97.5 volume percent. For example, the additive composition may comprise from 60 to 95 percent, or 70 to 90 percent, or 75 to 95 percent, or 80 to 97.5 percent, or 85 to 97.5 percent, or 90 to 97.5 percent by volume of the one or more multi-hydroxyl alcohols, based on the total volume of the additive composition. In certain embodiments, the one or more multi-hydroxyl alcohols may be present in the additive compositions of this disclosure in an amount ranging from about 60 to about 97.5 volume percent, more preferably from about 70 to about 95 volume percent, and even more preferably from about 80 to about 90 percent by volume, based on total volume of the additive composition.

The additive compositions of the present disclosure may comprise from at least about 2.5 percent by volume, up to about 40 percent by volume of a mixture consisting of one or more vegetable oil phospholipids, one or more free fatty acids, and soy oil, as described herein below in further details, based on the total volume of the additive composition. All individual values and subranges from at least 2.5 up to about 40 volume percent are included herein and disclosed herein; for example, the volume percent of the mixture consisting of one or more vegetable oil phospholipids, one or more free fatty acids, and soy oil can be from a lower limit of 2.5, 5, 10, 15, 20, 30, or 35 volume percent to an upper limit of 5, 10, 15, 20, 30, or 40 volume percent. For example, the additive composition may comprise from 2.5 to 35 percent, or 2.5 to 30 percent, or 2.5 to 25 percent, or 2.5 to 15 percent, or 5 to 15 percent, or 2.5 to 10 percent by volume of the mixture, based on the total volume of the additive composition. In certain embodiments the mixture may be present in the compositions of this disclosure in an amount ranging from about 2.5 to about 40 volume percent, more preferably from about 5 to about 30 volume percent, and even more preferably from about 10 to about 20 volume percent, based on total volume of the additive composition.

Alternatively, rather the a mixture consisting of one or more vegetable oil phospholipids, one or more free fatty acids, and soy oil, the additive compositions of the present disclosure may be formulated from separate sources of one or more vegetable oil phospholipids, one or more free fatty acids, and soy oil. In these embodiments, the additive compositions may comprise from at least about 0.75 percent by volume, up to about 20 percent by volume of one or more lecithins (phospholipids), as described hereinbelow in further details, based on the total volume of the additive composition. All individual values and subranges of at least 0.75 volume percent up to about 20 volume percent are included herein and disclosed herein; for example, the volume percent can be from a lower limit of 0.75, 1, 1.5, 1.7, 2.3, 2.5, 5, 10, 15, 16, 17, 18, 18.5, 19, or 19.5 volume percent to an upper limit of 2, 5, 10, 15, 16, 17, 18, 19 or 20 volume percent. For example, the additive composition may comprise from 2.5 to 20 percent, or 2.5 to 18 percent, or 2.5 to 17 percent, or 1.5 to 15 percent, or 5 to 15 percent, or 2.5 to 10 percent by volume of the one or more lecithins, based on the total volume of the additive composition. In certain embodiments, one or more lecithins may be present in an amount ranging from about 0.75 to about 20 volume percent, more preferably ranging from about 0.5 to about 6.0 volume percent, and even more preferably from about 3.0 to about 10 volume percent, based on the total volume of the additive composition.

In additive composition embodiments wherein the soy oil is added separately, the additive compositions of the present disclosure may comprise from at least about 0.75 percent by volume, up to about 16 percent by volume of soy oil, as described hereinbelow in further details, based on the total volume of the additive composition. All individual values and subranges of at least 0.75 volume percent up to about 16 volume percent are included herein and disclosed herein; for example, the volume percent can be from a lower limit of 0.75, 1, 1.5, 1.7, 2.3, 2.5, 5, 10, 15, or 15.5 volume percent to an upper limit of 2, 5, 10, 15, 15.5, or 16 volume percent. For example, the additive composition may comprise from 2.5 to 16 percent, or 2.5 to 15 percent, or 2.5 to 14 percent, or 1.5 to 15 percent, or 5 to 15 percent, or 2.5 to 10 percent by volume of soy oil, based on the total volume of the additive composition. In certain embodiments, soy oil may be present in an amount ranging from about 0.75 to about 16 volume percent, more preferably ranging from about 1.5 to about 12 volume percent, and even more preferably from about 3.0 to about 8.0 volume percent, based on the total volume of the additive composition.

The additive compositions of the present disclosure may comprise from at least about 0.1 pounds per barrel (ppb), up to about 10 ppb of one or more strong bases, as described hereinbelow in further details, based on 1 barrel of the additive composition. All individual values and subranges of at least 0.1 ppb up to about 10 ppb are included herein and disclosed herein; for example, the ppb can be from a lower limit of 0.1, 0.3, 0.5, 0.75, 1, 1.5, 1.7, 2.3, 2.5, 5, 7, 8, 8.5, 9, or 9.5 ppb to an upper limit of 2, 2.5, 3, 3.5, 4, 4.5, 5, 5.5, 7, 9, or 10 ppb. For example, the additive composition may comprise from 2.5 to 10 ppb, or 2.5 to 9 ppb, or 2.5 to 7 ppb, or 1.5 to 5 ppb, or 5 to 5.5 ppb, or 0.5 to 10 ppb of the one or more strong bases, based on 1 barrel of the additive composition. Strong bases useful in the additive compositions of this disclosure include one or more of NaOH, KOH, or $Ca(OH)_2$. In certain embodiments the one or more strong bases may be present in the additive compositions of this disclosure in an amount ranging from about 0.1 to about 10 ppb, more preferably from about 0.5 to about 5.0 ppb, and even more preferably from about 1.5 to about 3.0 pounds per barrel of the additive composition.

In additive composition embodiments wherein the one or more free fatty acids are added separately, the additive compositions of the present disclosure may comprise from at least about 0.25 percent by volume, up to about 8 percent by volume of one or more free fatty acids, as described hereinbelow in further details, based on the total volume of the additive composition. All individual values and subranges of at least 0.25 volume percent up to about 8 volume percent are included herein and disclosed herein; for example, the volume percent can be from a lower limit of 0.25, 0.3, 0.5, 0.75, 1, 1.5, 1.7, 2.3, 2.5, 5, 7, or 7.5 volume percent to an upper limit of 2, 2.5, 3, 3.5, 4, 4.5, 5, 5.5, 7, 7.5, or 8 volume percent. For example, the additive composition may comprise from 2.5 to 8 percent, or 2.5 to 7 percent, or 2.5 to 7.5 percent, or 1.5 to 5 percent, or 5 to 5.5 percent, or 0.5 to 8 percent by volume of the one or more free fatty acids, based on the total volume of the additive composition. Suitable free fatty acids include one or more saturated, monounsaturated, and polyunsaturated fatty acids. As used herein the term "free fatty acid" means an organic acid having one or more carboxylic acid moieties covalently bonded to a long-chain saturated or unsaturated hydrocarbon, where the long-chain hydrocarbon has from 8 to 50 carbon atoms. Suitable saturated fatty acids include myristic acid, palmitic acid, and stearic acid. Suitable monounsaturated fatty acids include palmitoleic acid, oleic acid, eicosenoic acid, erucic acid, and ricinoleic acid. Non-limiting examples of polyunsaturated fatty acids include linoleic acid, linolenic acid, and higher polyunsaturated fatty acids. The most common saturated oils contain from 14-18 carbon atoms, while the most common monounsaturated fatty acids contain from 16 to 22 carbons. Linoleic and linolenic acid, the polyunsaturated acids mentioned above, both contain 18 carbons, with the former containing two double bonds and the latter three double bonds. Compositional information on the fatty acid content of oils is available from a variety of sources, such as the *Handbook of Chemistry and Physics,* 56th Edition, © Chemical Rubber Corporation. In certain embodiments the one or more free fatty acids may be present in an amount ranging from about 0.25 to about 8.0 volume percent, more preferably from about 0.5 to about 6.0 volume percent, and more preferably from about 1 to about 4 volume percent, based on the total volume of the additive composition.

The additive compositions of the present disclosure may comprise from at least about 0.01 pounds per gallon (ppg), up to about 1 ppg of one or more shale inhibitors, as described hereinbelow in further details, based on 1 gallon of the additive composition. All individual values and subranges of at least 0.01 ppg up to about 8 ppg are included herein and disclosed herein; for example, the pounds per gallon can be from a lower limit of 0.01, 0.03, 0.05, 0.08, 0.1, 0.15, 0.3, 0.5, 0.7, or 0.8 ppg to an upper limit of 0.02, 0.03, 0.05, 0.1, 0.15, 0.5, 0.75, 0.8, 0.9, or 1 ppg. For example, the additive composition may comprise from 0.05 to 1 ppg, or 0.25 to 0.8 ppg, or 0.25 to 0.75 ppg, or 0.15 to 0.5 ppg, or 0.5 to 0.55 ppg, or 0.5 to 8 percent by volume of the one or more free fatty acids, based on the total volume of the additive composition. Suitable shale inhibitors include one or more of KOH, $CH_3CO_2K$, KCl, $K_2CO_3$, or $CHKO_2$. In certain embodiments the one or more shale inhibitors may be present in an amount ranging from about 0.01 to about 1.0 ppg, more preferably from about 0.04 to about 0.4 ppg, and more preferably from about 0.04 to about 0.1 ppg.

Water may be present in the additive compositions of the present disclosure up to and including about 20 volume percent, as described hereinbelow in further details, based on the total volume of the additive composition. If present, water is preferably fresh water. All individual values and subranges up to 20 volume percent are included herein and disclosed herein; for example, the volume percent water can be from a lower limit of 0.25, 0.3, 0.5, 0.75, 1, 1.5, 1.7, 2.3, 2.5, 5, 7, 7.5, 10, 15, or 19 volume percent to an upper limit of 2, 2.5, 3, 3.5, 4, 4.5, 5, 5.5, 7, 7.5, 8, 10, 11, 12, 13, 14, 15, 16, 17, 18, 19, or 20 volume percent. For example, the additive composition may comprise from 0 to 20 percent, or 2.5 to 17 percent, or 2.5 to 7.5 percent, or 1.5 to 5 percent, or 5 to 15.5 percent, or 0.5 to 18 percent by volume of water, based on the total volume of the additive composition. In certain embodiments, water may be present from about 2 to about 7 volume percent of the additive composition.

Suitable multi-hydroxyl alcohols (MHA) useful in additive compositions of the present disclosure include monomeric or polymeric polyols including but not limited to glycols, substituted glycols, glycol ethers, glycol esters, glycerols, substituted, glycerols, glycerol ethers, glycerol esters, polyglycerols, substituted polyglycerols, and alkyl glucosides wherein the alkyl has from 1 to 30 carbon atoms, and mixtures and combinations of two or more thereof. Specific examples of glycols include ethylene glycol, diethylene glycol, propylene glycol and polyethylene glycol. Specific examples of substituted glycols include 3-methoxy-1,2-propanediol, 3-chloro-1,2-propanediol, styrene glycol, cyclohexylethylene glycol, 1,2-hexanediol, and the like. Specific examples of glycol ethers include the glycol ethers of ethylene glycol dimethyl ether (glyme) and diethylene glycol dimethyl ether (diglyme). Specific examples of glycol esters include 1,2-Ethanediol monoacetate and ethylene glycol diacetate. Specific examples of glycerols include glycerol, trimethylolpropane, pentaerythritol, and the like. Specific examples of substituted glycerols include glycerol monochlorohydrin and other like halogen substitution compounds, glycerol mono acetic ester and other corresponding esters of the ethyl, propyl, butyl series (glycerol mono acetic ester is known also as monoacetin, which has the alpha and beta isomeic forms, either or both of which are suitable). Specific examples of glycerol ethers include compounds having the formula CH2(OH)CH(OH)CH2OR, wherein R represents a long chain, aliphatic hydrocarbon chain. Naturally occurring glycerol ethers are mixtures with varying number of carbon atoms in the side chain. Compounds having 16 to 18 carbon atoms are present in the largest quantities, but the number of carbon atoms varies mainly with the interval of 14-24. E.g. chimmyl alcohol and batyl alcohol are saturated glycerol ethers having 16 and 18 carbon atoms respectively in the side chain. Selachyl alcohol is an unsaturated glycerol ether with 18 carbon atoms. There also are found methoxysubstituted glycerol ethers, i.e. compounds wherein one hydrogen atom, mostly on carbon atom 2, has been replaced by a methoxy group (—OCH3). Specific examples of glycerol esters include glycerol monomyristate, glycerol monostearate, glycerol monooleate and the like. Specific examples of polyglycerols include those commercially available under the trade designation "POLYGLYCEROL-3" from Solvay which comprises about 15 to 30 wt % diglycerol; about 35 to 55 wt % triglycerol; about 10 to 25 wt % tetraglycerol; up to about 10 wt % pentaglycerol; and up to about 5 wt % hexaglycerol and higher order oligomers. Examples of substituted polyglycerols include mono-substituted polyglycerol, polyglycerol substituted with two hydrophobic groups, polyglycerol substituted with three hydrophobic groups, and/or polyglycerol substituted with more than three hydrophobic groups, where the hydrophobic segment is selected from an optionally substituted straight or branched alkylene group, which has a number of carbon atoms preferably ranging from 4 to 50, more preferably ranging from 8 to 30 and most preferably 10 to 25; or a polymer selected from an optionally substituted polyester, an optionally substituted polyether, an optionally substituted polycarbosilane, an optionally substituted polyurethane, an optionally substituted polysiloxane such as phenylalkylsiloxanes and dialkylsiloxanes, e.g., phenylmethylsiloxanes and dimethylsiloxanes, an optionally substituted polymer including a perfluoroalkyl group, an alkyl or aryl substituted poly(meth)acrylate and/or an optionally substituted polystyrene. Specific examples of alkyl glucosides include compounds corresponding to the general formula RO(G)x, in which R is a linear saturated $C_{1-22}$ alkyl radical, G is a glucose unit, x is a number of 1 to 10, including methyl glucoside, and the like.

The lubricant mix of additive compositions of the present disclosure may comprise, in certain embodiments, one or more vegetable oil phospholipids. Suitable vegetable oil phospholipids include soybean phospholipid, and phosphatidyl choline. Vegetable phospholipids such as soybean phospholipid are preferred. The vegetable oil phospholipids, particularly purified soybean phospholipid, are most suitable because they have a better emulsifying power and can form more uniform, finer and more stable phospholipid particles than animal-based phospholipids. Desirably, the vegetable oil phospholipids are purified to such an extent that the phosphatidyl choline content reaches at least 50% by weight, preferably at least 80% by weight. The soybean oil phospholipid so purified may have an iodine value of generally 30 to 50, preferably about 40.

Lecithins are any of a class of phospholipids based on phosphoric acid, an amine, fatty acids, and glycerol, a subset of which include choline in their structure, and they are therefore also referred to as phosphatidylcholines. The phosphatidylcholines are composed of phosphate, choline, glycerol (as the ester) and two fatty acids (saturated, and mono- and poly-unsaturated). Other lecithins include phosphatidylethanolamine and phosphatidylinositol. Various fatty acids pairs distinguish the various lecithins. "Commercial lecithin" is a wetting and emulsifying agent, and is a mixture of lecithins and other phospholipids in an edible oil. A publicly available structure for 1-Oleoyl-2-almitoyl-phosphatidylcholine is shown as Formula (1).

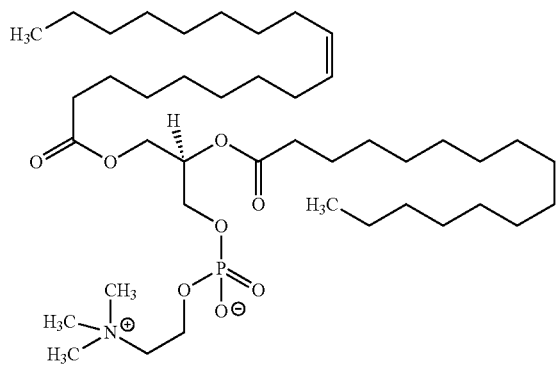

(1)

Method of Mixing the Additive

The method of mixing the additive compositions of the present disclosure is a critical feature of the disclosure, because if the ingredients are not mixed in the correct order and with sufficient agitation and pH control, the composition will not be fit for its intended purpose, and at worst will result in a useless, congealed mass. The process of mixing must result in an additive formulation that is pourable and remains so at the rig site so that it is transferable to, and mixable with, the customer's water-based drilling fluid. We have found the following procedure adequate for these purposes, but do not profess to know of every possible method that will result in a useable additive formulation. In our preferred method, MHA is added to a mixing device and approximately 1.0 pounds per barrel pre-hydrated or solubilized shale inhibitor is added with agitation. If additional shale inhibitor is requested it is added "pre-hydrated" to the MHA as well. Then, portions of the approximately 90% of the required amount of lubricant mix are slowly added with continued agitation, the pH being checked between additions and adjusted to 8.5+/−1.0 by adding either strong base or additional lubricant mix (the lubricant mix tends to be acidic). Finally, the last amount of lubricant mix is added with continued agitation and pH checked, adjusting as necessary with strong base.

The pH of additive compositions of the present disclosure may range from about 7.5 to about 9.5. All individual pH values and subranges from at least 7.5 up to about 9.5 are included herein and disclosed herein; for example, the pH of the additive composition can be from a lower limit of 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, or 9.4 up to an upper limit of 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, or 9.5. For example, the additive composition may have a pH ranging from 8.0 to 9.5, or from 8.5 to 9.0, or from 8.5 to 8.8, or from 9.0 to 9.5, or from 9.0 to 9.4 percent, or from 8.5 to 9.4.

Additive compositions of the present disclosure may exhibit pour point temperatures ranging from about 30° F. (−1° C.) to about 425° F. (218° C.), as measured in accordance with ASTM D-97. All individual pour point values and subranges from at least 30° F. (−1° C.) to about 425° F. (218° C.) are included herein and disclosed herein; for example, the pour point of the additive composition can be from a lower limit of −1, 0, 5, 10, 15, 50, 80, 100 or 120° C. up to an upper limit of 150, 160, 175, 190, 200, 210, or 218° C. For example, the additive composition may have a pour point ranging from 0 to 200° C., or from 10 to 90° C., or from 50 to 150° C., or from 20 to 95° C., or from 25 to 50° C.

Additive compositions of the present disclosure are formulated so as to not significantly increase or decrease the viscosity of a water-based drilling fluid to which they are added, as measured by standard tests described herein.

Additive compositions of the present disclosure may be formulated to decrease the API Filtrate amount and thickness of filter cake of a water-based drilling fluid to which they are added, as measured by standard tests described herein, by at least 10 percent, or no more than about 5 percent, or no more than about 2 percent.

The components of additive compositions of the present disclosure are heat stable to 300° F. (149° C.) as measured according to standard test described herein, and additive compositions have pour points of no less than water-based drilling fluids to which they are added, or at least have pour points that differ by no more than a few degrees, as measured by standard tests described herein.

The additive compositions of the present disclosure exhibit enhanced performance of water-based drilling fluids by combining a lubricant, shale inhibitor and organic base fluid with one or more free fatty acids, one or more lecithins, and soy oil to produce an additive composition that may be added to any water-based drilling fluid where increased performance is needed. Additive compositions of the present disclosure, have the ability to increase the performance of a water-based drilling, fracking, and other fluids to closely mimic that of emulsion-based muds by utilizing an organic fluid similar to the diesel or synthetic base fluid used in emulsion-based muds. The additive compositions of the present disclosure exhibit lubricity and stability due to the hydrocarbon influence of the MHA ingredient, but are also completely water soluble due to multiple hydroxyl groups attached to the non-polymeric, oligomeric, or polymer carbon chain of the MHA. This is combined with a lubricant mixture, one or more cationic shale inhibitors, one or more free fatty acids, and one or more lecithins to increase performance over commercially available water-based drilling fluids, and to increase performance over commercially available water-based drilling fluids mixed with our previously disclosed additive compositions. Without intending to be bound by any particular theory, we believe that the free fatty acids, lecithins, and soy oil have a synergistic effect to increase lubricity. This was unexpected and surprising to us.

The term "polymer" as used herein refers to a macromolecular compound prepared by polymerizing one or more monomers having one or more hydroxyl groups, or that may be modified after polymerization to have multiple hydroxyl groups. A polymer refers to homopolymers, copolymers, terpolymers, interpolymers, and so on. The term "interpolymer" is used herein interchangeably with the term copolymer to refer to polymers incorporating in polymerized form at least two copolymerizable monomers, or incorporating long chain branching as a result of chain termination. Accordingly, copolymers may result from the polymerization of a single monomer, under the correct operating conditions. The least prevalent monomer in the resulting copolymer or interpolymer is generally referred to by the term "comonomer". The chain length of the resulting long chain branches referred to above, is consequently longer than the carbon length resulting from polymerization of any deliberately added comonomer, and in particular, longer than 6 carbons. The presence of long chain branching may also be detected by the increased shear sensitivity of the polymer, as disclosed in EP-A-608,369, and elsewhere, or determined by Melt Index Ratio (MIR), a ratio of polymer melt viscosities measured under differing loads, especially $I_{21}/I_2$.

Polymer weight-average molecular weight (Mw) is measured by gel permeation chromatography, one technique of which is described in U.S. Pat. No. 5,272,236. Alternatively, melt index, $I_2$, measured, for example, according to ASTM D-1238 may be employed as an indication of molecular weight. Generally, melt index is inversely related to the molecular weight of the polymer. The higher the molecular weight, the lower the melt index, although the relationship is not necessarily linear.

Optional Ingredients

Optionally, other ingredients than those specifically mentioned herein may be used in the additive compositions and drilling fluid compositions without deviating from the scope of the present disclosure. For example, optional ingredients may include one or more of an antifoam, a biocide, a bridging agent, a corrosion control agent, a dispersant, a flocculant, a fluid loss additive, a foamer, an $H_2S$ scavenger (for example one or more alkanol amines), a lubricant (other than the lubricant mix of one or more vegetable oil phospholipids), an oxygen scavenger, a scale inhibitor, a viscosifier, and a weighting agent, and other additives known to those skilled in the art. While optional for purposes of the present invention, other components may be highly advantageous for product stability during and after the manufacturing process.

Furthermore, certain additive composition and water-based drilling fluid embodiments of the present invention may optionally include a thickener. Thickeners may be useful to increase the viscosity of low viscosity additive compositions and/or water-based drilling fluid compositions. Thickeners suitable for use herein may be any known in the art such as for instance xanthan gum, polyacrylate type or associated nonionic thickeners such as modified cellulose ethers. For example, suitable thickeners include ALCOGUM™ VEP-II (trademark of Akzo Nobel Surface Chemistry LLC, Chicago, Ill.), RHEOVIS™ and VISCALEX™ (trademarks of Ciba Specialty Chemicals Water Treatments Limited Company, United Kingdom), UCAR® Thickener 146, or ETHOCEL™ or METHOCEL™ (trademarks of the The Dow Chemical Company) and PARA-GUM™ 241 (trademark of Para-Chem Southern, Inc.), or BERMACOL™ (trademark of Akzo Nobel) or AQUA-LON™ (trademark of Hercules Incorporated, Wilmington, Del.) or ACUSOL® (trademark of Rohm and Haas). Thickeners may be used in any amount necessary to prepare an additive composition or drilling fluid of desired viscosity.

The ultimate viscosity of the additive composition or drilling fluid is, therefore, controllable. Addition of the thickener to the additive composition or drilling fluid may be done with conventional means to result in viscosities as needed. Viscosities of the additive composition or drilling fluid dispersions may reach +500 cP (Brookfield spindle 4 with 20 rpm) with viscosifier dosing.

Also, certain additive composition and drilling fluid embodiments of the present disclosure are characterized by their stability after being formulated. In this context, stability refers to the stability of viscosity of the resultant additive composition or drilling fluid. In order to test the stability, the viscosity is measured over a period of time. Preferably, viscosity measured at 120° F. should remain +/−10% of the original viscosity over a period of 24 hours, when stored at room temperature (about 75° F.).

Examples 1-10

Preparation of Additive Composition

Additive Compositions (AC) 1-10 of Examples 1-10 were formulated as presented in Table 1. Physical properties and test results using Additive Compositions 1-10 of Examples 1-10 are presented in Table 2. Tables 3 and 4 present compositions of three common drilling fluid formulations, modified by admixing the additive composition of Example 9. In Table 3, "Midway", Eagle Ford", and "Marcellus" refer to shale samples taken from the shale formations of the same name, which are well-know to those skilled in this art. Also in Table 3, the percentages (1.0%, 2.5%, 5.0%, and 10%) refer to the weight percentage of Additive Composition 9 ("AC9") added.

Testing methods for testing shale inhibition, lubricity and other properties of the additive compositions of Examples 1-10 were tested in accordance with the test methods explained herein.

"BLM"—Base Lab Mud—untreated that is.

"600/300" are measurements of rheology—direct reading measurements taken from the viscometer at 600 rpms and 300 rpms. The viscometer used is described in the test methods.

"pv"=plastic viscosity.

"yp"=yield point.

Plastic viscosity (pv) and yield point (yp) are calculated from the 600/300 viscometer readings:

$pv$=(viscometer reading at 600 rpm)−(viscometer reading at 300 rpm);

$yp$=(viscometer reading at 300 rpm)−$pv$.

"Gels"—these are the gel strengths of the fluid—they are essentially the maximum direct reading of the viscometer at 3 rpm after allowing fluid to rest for 10 sec, 10 minutes, and 30 min.

TABLE 1

Additive Compositions

| Component | Additive Composition (AC) | | | | | | | | | |
|---|---|---|---|---|---|---|---|---|---|---|
| | 1 | 2 | 3 | 4 | 5 | 6 | 7 | 8 | 9 | 10 |
| Lubricant mix | | | | | | | | | | |
| (Vegetable Oil Phospholipids) (V %) | 2.5 | 2.5 | 2.5 | 5 | 5 | 10 | 10 | 20 | 20 | 40 |
| Free fatty acids (V %) | 0.55 | 0.55 | 0.55 | 1.1 | 1.1 | 2.2 | 2.2 | 4.4 | 4.4 | 8.8 |
| Lecithin (V %) | 1.225 | 1.225 | 1.225 | 2.45 | 2.45 | 4.9 | 4.9 | 9.8 | 9.8 | 19.6 |
| Soy Oil (V %) | 0.725 | 0.725 | 0.725 | 1.45 | 1.45 | 2.9 | 2.9 | 5.8 | 5.8 | 11.6 |
| Shale inhibitor (ppg) | | | | | | | | | | |
| $CH_3CO_2K$ | 0.01 | 0.3 | 0.4 | 0.5 | 0.75 | 0.5 | 0.75 | 0.5 | 0.5 | 0.75 |
| KCl | 0.01 | 0 | 0 | 0 | 0 | 0 | 0 | 0 | 0 | 0 |
| $K_2CO_3$ | 0.01 | 0.3 | 0.2 | 0 | 0 | 0 | 0 | 0 | 0 | 0 |
| $CHKO_2$ (ppg) | 0.01 | 0.3 | 0.4 | 0 | 0.25 | 0 | 0.25 | 0 | 0.25 | 0.25 |
| Strong base (ppb) | | | | | | | | | | |
| NaOH | 0.1 | 0 | 0 | 1 | 0 | 1 | 0 | 2.25 | 0 | 3 |
| KOH | 0 | 0.2 | 0.2 | 0 | 1 | 0 | 0.75 | 0 | 2.5 | 0 |
| $Ca(OH)_2$ | 0 | 0 | 0.1 | 0 | 0.25 | 0 | 0.5 | 0 | 0 | 0 |
| Multi-hydroxyl alcohol (V %) | 80 | 85 | 95 | 80 | 90 | 75 | 85 | 70 | 75 | 50 |
| Balance water (V %) | 17.5 | 12.5 | 2.5 | 15 | 5 | 15 | 5 | 10 | 5 | 10 |

TABLE 2

Pysical Properties

| Additive Composition | Viscosity (cP) | Pour Point (° F.) | pH | Specific Gravity | Shelf Life 4 weeks at RT* | Shelf Life 72 hrs at 150° F. |
|---|---|---|---|---|---|---|
| 1 | 96 | <20 | 8.4 | 1.16 | + | + |
| 2 | 98 | <20 | 8.6 | 1.17 | + | + |
| 3 | 91 | <20 | 9.1 | 1.19 | + | + |
| 4 | 208 | <20 | 9.1 | 1.16 | + | + |
| 5 | 194 | <20 | 9.4 | 1.18 | + | + |
| 6 | 316 | <20 | 8.4 | 1.16 | + | + |
| 7 | 301 | <20 | 8.6 | 1.18 | + | + |
| 8 | 482 | 20-30 | 9.1 | 1.15 | + | + |
| 9 | 455 | 30 | 9.2 | 1.16 | + | + |
| 10 | 793 | 45 | 8.3 | 1.12 | +/− | +/− |

*"RT" means room temperature, about 75° F.

TABLE 3

Comprehensive lab testing performed on Additive Composition 9. All samples heat rolled 16 hrs at 200° F. for testing

| | BLM | 1.0% | 2.5% | 5.0% | 10.0% | |
|---|---|---|---|---|---|---|
| | Conventional WBM | | | | | |
| 600/300 | 33/21 | 34/22 | 38/25 | 39/26 | 42/28 | Formulations |
| pv/yp | 12/9 | 12/10 | 13/12 | 13/13 | 14/14 | Conventional |
| Gels | 3/5/7 | 3/5/7 | 3/6/8 | 4/8/10 | 5/9/14 | 23 ppb bentonite |
| Filtrate | 6.8 | 6.8 | 6.6 | 6.4 | 6.0 | 3.0 ppb Cypan |
| Lubricity | 0.347 | 0.302 | 0.216 | 0.116 | 0.064 | 15 ppb rev dust |
| % Inhibition Midway | 68.1 | 71.1 | 83.1 | 90.2 | 95.1 | (commercially available simulated drill solids) |
| % Inhibition Eagle Ford | 37.4 | 47.1 | 52.6 | 80.2 | 91.1 | 40 ppb barite |
| % Inhibiton Marcellus | 46.8 | 58.1 | 68.2 | 82.1 | 94.2 | |
| | Dispersed WBM | | | | | |
| 600/300 | 32/22 | 30/21 | 32/22 | 34/23 | 35/24 | Dispersed |
| pv/yp | 10/12 | 9/12 | 10/12 | 11/12 | 11/13 | 20 ppb bentonite |
| Gels | 2/2/3 | 2/2/3 | 2/3/3 | 2/4/5 | 3/3/7 | 3 ppb cypan |
| Filtrate | 5.9 | 5.9 | 5.9 | 5.8 | 5.7 | 3 ppb Lignosulfonate |
| Lubricity | 0.361 | 0.321 | 0.221 | 0.128 | 0.091 | 10 ppb Lignite |
| % Inhibition Midway | 72.3 | 76.1 | 88.00 | 90.9 | 94.9 | 5.0 molar NaOH solution to pH 9.5 |

TABLE 3-continued

Comprehensive lab testing performed on Additive Composition 9. All samples heat rolled 16 hrs at 200° F. for testing

|  | BLM | 1.0% | 2.5% | 5.0% | 10.0% |  |
|---|---|---|---|---|---|---|
| % Inhibition Eagle Ford | 45.6 | 52.3 | 71.1 | 85.9 | 92.3 | 15 ppb rev dust<br>40 ppb barite |
| % Inhibiton Marcellus | 47.1 | 56.1 | 66.2 | 83.5 | 95.2 |  |
| Xanthan PAC Polymer Mud | | | | | | |
| 600/300 | 66/40 | 66/40 | 66/40 | 66/40 | 68/41 | Polymer |
| pv/yp | 26/14 | 26/14 | 26/14 | 25/14 | 27/14 | .75 ppb Xanthan |
| Gels | 6/6/7 | 5/6/7 | 6/6/7 | 6/7/7 | 5/6/7 | 1.5 ppb PAC R |
| Filtrate | 6.4 | 6.4 | 6.4 | 6.2 | 5.9 | 5.0 molar NaOH solution to pH 9.5 |
| Lubricity | 0.302 | 0.294 | 0.241 | 0.133 | 0.092 | 15 ppb rev dust |
| % Inhibition Midway | 59.2 | 65.2 | 84.3 | 87.2 | 96.2 | 40 ppb barite |
| % Inhibition Eagle Ford | 29.2 | 44.1 | 54.2 | 84.1 | 93.4 |  |
| % Inhibiton Marcellus | 38.2 | 45.2 | 62.1 | 86.4 | 94.8 |  |

TABLE 4

Mud prepared and split into equal parts. AC9 was added to 1/2 and both samples heat rolled 16 hours at 200° F. to condition. Initial ("Before") properties tested and recorded. Heat Rolled again at 300° F. for 16 hours to determine stability ("After").

|  | BLM | | BLM + 10% AC9 | | |
|---|---|---|---|---|---|
|  | Before | After | Before | After |  |
| Conventional WBM | | | | | |
| 600/300 | 40/25 | 39/26 | 48/30 | 49/33 | Formulations |
| pv/yp | 15/10 | 13/13 | 18/12 | 16/17 | Conventional |
| Gels | 2/4/6 | 4/5/9 | 5/6/9 | 7/7/13 | 23 ppb bentonite |
| Filtrate | 6.7 | 7.0 | 6.1 | 6.3 | 3.0 ppb Cypan |
| Lubricity | 0.331 | 0.322 | 0.085 | 0.116 | 15 ppb rev dust<br>(commercially available simulated drill solids)<br>40 ppb barite |
| Dispersed WBM | | | | | |
| 600/300 | 41/27 | 41/25 | 44/29 | 38/24 | Dispersed |
| pv/yp | 14/13 | 16/9 | 15/14 | 14/10 | 23 ppb bentonite |
| Gels | 4/5/8 | 2/3/4 | 4/5/9 | 3/6/6 | 3 ppb cypan |
| Filtrate | 5.8 | 6.2 | 5.5 | 5.8 | 3 ppb Lignosulfonate |
| Lubricity | 0.359 | 0.347 | 0.112 | 0.124 | 10 ppb Lignite<br>5.0 molar NaOH solution to pH 9.5<br>15 ppb rev dust<br>40 ppb barite |
| Xanthan PAC Polymer Mud | | | | | |
| 600/300 | 66/44 | 52/32 | 65/41 | 55/34 | Polymer |
| pv/yp | 24/18 | 20/12 | 24/17 | 21/13 | 1.0 ppb Xanthan |
| Gels | 6/8/8 | 4/4/5 | 7/8/9 | 4/5/5 | 2.25 ppb PAC R |
| Filtrate | 5.9 | 6.9 | 5.5 | 6.3 | 5.0 molar NaOH solution to pH 9.5 |
| Lubricity | 0.308 | 0.319 | 0.092 | 0.101 | 15 ppb rev dust<br>40 ppb barite |

Physical Property and Performance Testing
Lubricity Test (% Torque Reduction)

The lubricity test was conducted according to OFITE Extreme Pressure and Lubricity Tester Instruction Manual ver. 1.4. In this test, a sample of drilling fluid is placed in a cup, a steel block having a rounded inset surface is immersed in the fluid is pressed at 150 psi against a steel ring rotating at 60 RPM and torque is determined based on increased resistance and read off of the display screen. Testing fluid is prepared as a control and treated with increasing concentrations of additive composition. Prepared fluid was then allowed to age for 16 hours at 200° F. in an OFITE four roller oven. After aging, cells were allowed to cool to less than 120° F. before testing. Aging cells were opened and the fluid was allowed to mix on a Hamilton Beach spindle type mixer for ten minutes before testing on the OFITE model 111-00 lubricity meter. The lubricity meter was allowed to warm up for 15 minutes and block and ring were cleaned thoroughly with acetone and rinsed with water before ensuring torque reading of deionized water was within range (34.0±2.0) at 150 inch-pounds and 60 rpm. To determine lubricity of testing fluid, it was added to the provided steel cup and raised until ring and block were submerged in fluid. Torque was adjusted to 150 inch-pounds and allowed to run for 5 minutes before torque reading was recorded. Torque readings were recorded every three minutes after that until they stabilized to within ±0.5 on consecutive readings. Torque reading is converted to coefficient of lubricity by dividing torque reading by 100. Percent torque reduction is based upon the torque reading of a fluid treated with a lubricant (in this case a drilling fluid) relative to the same sample fluid untreated, and may be reported as % torque reduction at a given load=$[1-(T_{ts}/T_{us})]\times 100$ where $T_{ts}$=torque reading of treated sample under a constant force, and $T_{us}$=torque reading of untreated sample under same force.

Hot Roll Dispersion Test

This test involves exposing a weighed quantity of sized shale pieces to a formulated fluid in a conventional roller oven cell. The test provides a long-term exposure of the shale to the fluid under mild agitation conditions. Under such conditions, dispersion of the shale into the fluid will occur depending on the tendency of the shale to disperse and the inhibitive properties of the fluid. The rheological characteristics of the fluid can also influence the test results by altering the amount of agitation in the rolling phase. For these tests the rheological parameters of each fluid tested are designed to be similar to minimize any inaccuracies in cross-fluid comparisons. The fluid and shale are rolled together in a roller oven for 16 hours at 200° F. Following cooling to room temperature, the fluid is poured out over a 1-mm sieve, and the shale pieces remaining are recovered, washed, weighed, dried overnight at 210° F. and re-weighed. The percentage recovery of the shale are determined. (See also US Pub Pat. App. No. 2004/0204323).

Viscosity

Viscosity was measured at 120° F. using a OFITE Model 800 direct-indicating viscometer as per API RP 13B-1 and the manufactures manual of the viscometer. Sample was placed in a heated cup and rotor sleeve was immersed in fluid up to the indicator line. The cup was set to 120° F. and temperature allowed to equilibrate while stirring at 300 rpm. Upon equilibration, the viscometer was adjusted to the 600 rpm setting and dial reading was allowed to reach a steady value. That value was recorded and the same was repeated for 300, 6, and 3 rpm settings. The gel strength values were then determined by allowing the sample to completely mix at 600 rpm. The rotor was stopped and fluid allowed to sit undistributed for 10 seconds. The rotor was then switched to the 3 rpm reading and the maximum reading was observed and recorded. The fluid was once again allowed to completely mix at 600 rpm and determination of gel strength repeated for 10 and 30 minute values.

API Filtrate (Amount and Thickness)

The "API Filtrate" test was conducted according to API Recommended Practice for Field Testing Water-based Drilling Fluids, API RP 13B-1 ("API" refers to American Petroleum Institute). In this test, a sample of drilling fluid is placed in a closed cylinder and compressed so that liquid filtrate from the drilling fluid passes through a filter paper. The amount of liquid filtrate collected in 30 minutes of compression is recorded in milliliters (mL) to the nearest 0.1 ml. A filter cake is taken out of the device and its thickness measured, usually at the center of the filter cake, that thickness being measured to the nearest 1/32 inch of the nearest millimeter. The tests were carried out on a Series 300 LPLT Filter Press, available from Fann Instrument Company, Houston, Tex.

Pour Point

Pour point was measured using a refrigerator with an adjustable thermostat and visual inspection of sample at different temperatures. 100 ml aliquots of sample were added to 125 ml round glass containers. These samples were then placed into either the freezer or refrigerator portion and thermostat adjusted. Temperature was measured using a 500 ml Nalgene container filled with white oil and the lid modified to allow for the retrofitting of a probe for a digital type thermometer. Temperature of samples was allowed to equilibrate while sitting undisturbed. Upon equilibration, the sample was removed and tilted to approximately a 45° angle and observed. Pour point was determined to be the lowest temperature at which sample immediately moves with some liquidity as angle was applied to bottle. Temperature was then directly verified in each sample by opening sample container and measuring with a digital type thermometer.

Flash Point

Flashpoint was measured with a Koehler K14600 Tag Closed Cup Flash Tester by the method of ASTM D-56.

Shelf Life

Shelf life was determined by allowing samples to age undisturbed for a period of time naturally or by applying heat using a water-bath. 100 ml of sample was added to 125 ml cylindrical glass bottles and allowed to sit at room temperature (approximately 75° F.) undisturbed for a minimum of four weeks. The jar was inspected for any obvious signs of product separation. Finally, the lid to the sample jar was removed in a manner as to create the least amount of disturbance and contents poured off. Observations were recorded on product that had settled out. Alternatively, samples were placed in a water bath at 150° F. for 72 hours and allowed to return to room temperature before observation as described above.

Heat Stability

Heat stability of product was determined by adding additive composition at a range of concentrations to various drilling fluid formulations and observing for obvious signs of breakdown as well as adverse effects to drilling fluid properties including lubricity, API filtrate, and rheology values.

ROP and Wellbore Stability Tests

ROP and wellbore stability testing is ongoing. To date, tests have been performed in approximately 30 Woodbine, Navaro and/or Austin Chalk laterals in the northern part of the Eagle Ford shale play in Madison, Leon, Walker, Grimes and Houston counties (Texas). Typical mud systems in the area include dispersed, semi-dispersed, Xan/PAC polymer, and low solids non-dispersed systems. Additive compositions were typically added to those wells in the intermediate section with increasing concentrations in the curve and lateral sections. Results included greater than anticipated increases in rate of penetration (up to 30 percent) and wellbore stability. Usage of product varied from two to approximately ten percent by volume. No apparent adverse effects to drilling fluid properties were observed during usage.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, Section F, unless "means for" is explicitly recited together with an associated function. "Means for" clauses are intended to cover the structures, materials, and acts described herein as performing the recited function and not only structural equivalents, but also equivalent structures.

What is claimed is:

1. An additive composition for boosting performance of water-based drilling fluids, the additive composition consisting essentially of:
   (a) from 60 to 70 volume percent of one or more multi-hydroxyl alcohols containing chloride levels less than 5000 parts per million, based on total volume of the additive composition;
   (b) from 30 to 40 volume percent of a lubricant consisting of a mixture of two or more vegetable oil phospholipids, one or more free fatty acids, and soy oil, based on total volume of the additive composition;
   (c) from about 0.25 to about 8.0 volume percent of one or more free fatty acids, based on total volume of the additive composition;
   (d) from about 0.75 to about 20 volume percent of one or more lecithins;
   (e) from about 0.75 to about 16 volume percent of soy oil;
   (f) from about 0.01 to about 1.0 pounds per gallon of one or more shale inhibitors, based on one gallon of the additive composition;
   (g) from about 0.1 to about 10 pounds per barrel of one or more strong bases, based on one barrel of the additive composition; and
   (h) optionally in the presence of water, up to about 20 percent by volume, based on total volume of the additive composition;
with the proviso that if (b) is present, then (c), (d), and (e) are absent, and vice versa.

2. The additive composition of claim 1 wherein the one or more multi-hydroxyl alcohols is selected from the group consisting of monomeric or polymeric polyols including but not limited to glycols, substituted glycols, glycol ethers, glycol esters, glycerols, substituted glycerols, glycerol ethers, glycerol esters, polyglycerols, substituted polyglycerols, and alkyl glucosides wherein the alkyl has from 1 to 30 carbon atoms, and mixtures and combinations of two or more thereof.

3. The additive composition of claim 2 wherein the two or more vegetable oil phospholipids are selected from the group consisting of soybean phospholipid, phosphatidyl choline and mixtures and combinations thereof.

4. The additive composition of claim 1 wherein the one or more free fatty acids are selected from the group consisting of one or more saturated, monounsaturated, and polyunsaturated fatty acids, and mixtures and combinations of two or more thereof.

5. The additive composition of claim 1 wherein the one or more lecithins are selected from the group consisting of phosphatidylcholines, phosphatidylethanolamine, phosphatidylinositol, and mixtures and combinations of two or more thereof.

6. The additive composition of claim 1 wherein the one or more shale inhibitor is selected from the group consisting of KOH, $CH_3CO_2K$, KCl, $K_2CO_3$, and $CHKO_2$, and mixtures and combinations of two or more thereof.

7. The additive composition of claim 1 wherein the one or more strong bases is selected from the group consisting of NaOH, KOH, or $Ca(OH)_2$, and mixtures and combinations of two or more thereof.

8. The additive composition of claim 1 having a pH ranging from about 8.5 to about 9.5.

9. A water-based drilling fluid comprising:
   (a) from about 1 to about 50 volume percent of the additive composition of claim 1; and
   (b) balance of a water-based drilling fluid.

10. The water-based drilling fluid of claim 9 wherein the one or more multi-hydroxyl alcohols is selected from the group consisting of monomeric or polymeric polyols including but not limited to glycols, substituted glycols, glycol ethers, glycol esters, glycerols, substituted glycerols, glycerol ethers, glycerol esters, polyglycerols, substituted polyglycerols, and alkyl glucosides wherein the alkyl has from 1 to 30 carbon atoms, and mixtures and combinations of two or more thereof.

11. The water-based drilling fluid of claim 9 wherein the two or more vegetable oil phospholipids are selected from the group consisting of soybean phospholipid, phosphatidyl choline, and mixtures and combinations thereof.

12. The water-based drilling fluid of claim 9 wherein the one or more free fatty acids are selected from the group consisting of one or more saturated, monounsaturated, and polyunsaturated fatty acids, and mixtures and combinations of two or more thereof.

13. The water-based drilling fluid of claim 9 wherein the one or more lecithins are selected from the group consisting of phosphatidylcholines, phosphatidylethanolamine, phosphatidylinositol, and mixtures and combinations of two or more thereof.

14. The water-based drilling fluid of claim 9 wherein the one or more shale inhibitor is selected from the group consisting of KOH, $CH_3CO_2K$, KCl, $K_2CO_3$, and $CHKO_2$, and mixtures and combinations of two or more thereof.

15. The water-based drilling fluid of claim 9 wherein the one or more strong bases is selected from the group consisting of NaOH, KOH, or $Ca(OH)_2$), and mixtures and combinations of two or more thereof.

16. A method of drilling a well bore in a subterranean formation comprising shale comprising the steps of:
   (a) providing a modified water-based drilling fluid comprising an additive composition of claim 1 admixed with a water-based drilling fluid;
   (b) drilling the well bore in at least a portion of the subterranean formation that comprises shale using the modified drilling fluid; and
   (c) allowing the modified drilling fluid to at least partially inhibit the degradation of the shale.

17. The method of claim 16 wherein the one or more multi-hydroxyl alcohols is selected from the group consisting of monomeric or polymeric polyols including but not limited to glycols, substituted glycols, glycol ethers, glycol esters, glycerols, substituted glycerols, glycerol ethers, glycerol esters, polyglycerols, substituted polyglycerols, and alkyl glucosides wherein the alkyl has from 1 to 30 carbon atoms, and mixtures and combinations of two or more thereof.

18. The method of claim 16 wherein the two or more vegetable oil phospholipids are selected from the group consisting of soybean phospholipid, phosphatidyl choline and mixtures and combinations.

19. The method of claim 16 wherein the one or more free fatty acids are selected from the group consisting of one or more saturated, monounsaturated, and polyunsaturated fatty acids, and mixtures and combinations of two or more thereof.

20. The method of claim 16 wherein the one or more lecithins are selected from the group consisting of phosphatidylcholines, phosphatidylethanolamine, phosphatidylinositol, and mixtures and combinations of two or more thereof.

21. The method of claim 16 wherein the one or more shale inhibitor is selected from the group consisting of KOH, $CH_3CO_2K$, KCl, $K_2CO_3$, and $CHKO_2$, and mixtures and combinations of two or more thereof.

22. The method of claim 16 wherein the one or more strong bases is selected from the group consisting of NaOH, KOH, or $Ca(OH)_2$, and mixtures and combinations of two or more thereof.

23. The method of claim 16 wherein the additive composition has a pH ranging from about 7.5 to about 9.5.

24. The method of claim 16 wherein the drilling fluid further comprises at least one additive selected from the group consisting of an antifoam, a biocide, a bridging agent, a corrosion control agent, a dispersant, a flocculant, a fluid loss additive, a foamer, an $H_2S$ scavenger, a lubricant, an oxygen scavenger, a scale inhibitor, a viscosifier, and a weighting agent.

25. The method of claim 16 wherein the density of the drilling fluid is within the range of from about 7 pounds per gallon to about 22 pounds per gallon.

26. The method of claim 16 wherein the water is fresh water.

27. A method of enhancing the shale inhibition of a water-based drilling fluid comprising:
   (a) adding to the drilling fluid the additive composition of claim 1 to form a modified drilling fluid;
   (b) placing the modified drilling fluid in a well bore penetrating at least a portion of a subterranean formation that comprises shale; and
   (c) allowing the modified drilling fluid to at least partially inhibit the degradation of the shale.

28. The method of claim 27 wherein the shale inhibitor is added to the additive composition in an amount sufficient to inhibit the degradation of shale.

29. A method of drilling a well bore in a subterranean formation comprising:
   (a) providing a modified water-based drilling fluid that comprises the additive composition of claim 1;
   (b) drilling a well bore using the modified drilling fluid in at least a portion of the subterranean formation that comprises shale; and
   (c) allowing the modified drilling fluid to at least partially inhibit the degradation of the shale.

30. A method of drilling in a subterranean formation that comprises shale, the method comprising:
   (a) providing a modified drilling fluid comprising a water-based drilling fluid admixed with the additive composition of claim 1;
   (b) drilling the well bore in at least a portion of the subterranean formation that comprises shale using the modified drilling fluid; and
   (c) allowing the modified drilling fluid to at least partially inhibit the degradation of the shale.

31. A method of increasing lubricity of a water-based drilling fluid while drilling in a subterranean formation that comprises shale, the method comprising:
   (a) providing a modified drilling fluid comprising a water-based drilling fluid admixed with the additive composition of claim 1, the modified drilling fluid exhibiting increased lubricity in shale compared with the water-based drilling fluid; and
   (b) drilling the well bore in at least a portion of the subterranean formation that comprises shale using the modified drilling fluid.

* * * * *